Oct. 27, 1925.

G. E. ALLEMAN 1,559,060

SCRAPER BLADE

Filed March 28, 1923

Grant E. Alleman, Inventor

By [signature], Attorney

Patented Oct. 27, 1925.

1,559,060

UNITED STATES PATENT OFFICE.

GRANT E. ALLEMAN, OF SHOEMAKERSVILLE, PENNSYLVANIA.

SCRAPER BLADE.

Application filed March 28, 1923. Serial No. 628,395.

*To all whom it may concern:*

Be it known that I, GRANT E. ALLEMAN, a citizen of the United States, residing at Shoemakersville, in the county of Berks and State of Pennsylvania, have invented certain new and useful Improvements in Scraper Blades, of which the following is a specification.

This invention relates to improvements in scraper blades and the object in the present instance is to provide a simple and effective scraper blade, adapted for use in an agitator connected with a suction dredge.

In devices of this character, the agitator is carried on the lower extremity of the suction device, and the agitator drags through the muck on the river bottom. This agitator, among other things, consists of a plurality of scraper blades arranged in an endless chain, and adapted to travel in a casing. The wall of this casing is constantly being coated with mud and other sediment, and it is the object in the present instance to provide a serviceable and effective scraper blade for keeping this portion of the device free and insuring that the sediment will be properly agitated.

The invention is more fully described in the following specification and clearly illustrated in the accompanying drawing, in which:—

Figure 1:
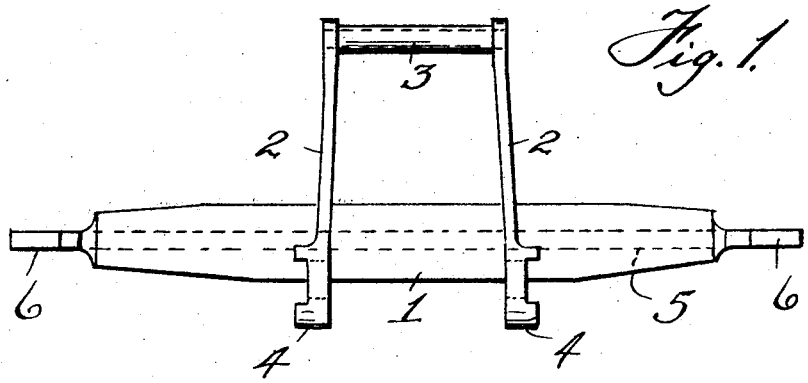
Figure 1 is a plan view of my scraper.
Figure 2:
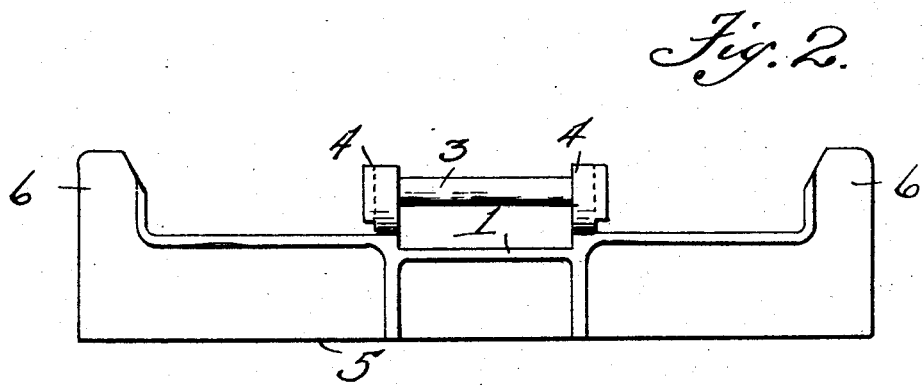
Figure 2 is a front elevation thereof.

The numeral 1 designates the body portion of the blade, which is formed integrally with a yoke member, comprising two parallel bars 2 and a spindle member 3 joining the ends of the bars, while each bar is formed with an enlarged sleeve portion 4 formed integrally therewith and projecting upward from the body portion 1.

Along the under side of the body portion 1 I form an integral blade or scraper portion 5, extending the full length of the body portion, and its extremities are extended upward, to form a pair of upright members 6, which members, when the scraper is in action, will insure the vertical or side walls of the casing in which it works to be scraped at the same time, and just as effectually as the other portion of the scraper effects the desired object.

It is evident that this vertical or upright portion of the scraper blade will not only insure a more thorough scraping, but it will tend to hold the blade and the body of the scraper in proper alinement across the path of travel, in other words, the tendency to buckle will be greatly eliminated.

The device may be made of any suitable material, but I prefer to use cast metal, preferably iron.

Having thus described my invention, I claim and desire to secure by Letters Patent:—

A scraper blade for conveyors including a body member with a chain engaging yoke issuing from one face and a blade issuing from the opposite face along the longitudinal center of the body whereby the marginal edges of the latter project beyond the sides of the blade, the terminals of said blade extending at right angles to the body and being in parallel relation to the yoke member.

In testimony whereof I affix my signature.

GRANT E. ALLEMAN.